(12) United States Patent
Saitou et al.

(10) Patent No.: US 7,914,071 B2
(45) Date of Patent: Mar. 29, 2011

(54) FRONT STRUCTURE OF VEHICLE BODY

(75) Inventors: Hidekazu Saitou, Hiratsuka (JP);
Kiyohito Sekido, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 194 days.

(21) Appl. No.: 12/328,221

(22) Filed: Dec. 4, 2008

(65) Prior Publication Data
US 2009/0146456 A1 Jun. 11, 2009

(30) Foreign Application Priority Data

Dec. 7, 2007 (JP) .................................. 2007-316971
Aug. 7, 2008 (JP) .................................. 2008-204366

(51) Int. Cl.
*B62D 25/08* (2006.01)

(52) U.S. Cl. ..................... 296/193.09; 180/68.4; 70/240

(58) Field of Classification Search ............. 296/193.09, 296/193.1, 193.11; 180/68.4, 69.23; 292/DIG. 14; 70/240
See application file for complete search history.

(56) References Cited

U.S. PATENT DOCUMENTS

| 6,189,958 B1 | 2/2001 | Guyomard et al. |
| 6,923,495 B2 * | 8/2005 | Kishikawa et al. ...... 296/193.09 |
| 7,377,579 B2 * | 5/2008 | Kwon ....................... 296/193.09 |

FOREIGN PATENT DOCUMENTS

JP 2001-018837 A 1/2001

* cited by examiner

*Primary Examiner* — Joseph D Pape
(74) *Attorney, Agent, or Firm* — Foley & Lardner LLP

(57) ABSTRACT

A front structure of a vehicle body is disclosed as having a radiator core support including an upper member and a lower member vertically spaced from each other and extending in a vehicle width direction. The upper member is structured in two stages on upper and lower sides composed of an upper-stage upper member and a lower-stage upper member, which have both left and right ends connected to vehicle body components placed in a vehicle body on both sides thereof.

6 Claims, 5 Drawing Sheets

FRONT STRUCTURE OF VEHICLE BODY

BACKGROUND OF THE INVENTION

1. Field of the Invention

The present invention relates to a front structure of a vehicle body of an automotive vehicle.

2. Description of the Related art

An automotive vehicle has an engine room whose upper area is covered with a hood panel for opening and closing capability. The hood panel has a rear end portion provide with a hinge portion about a center of which a front end portion of the hood panel is opened or closed. The front end portion is detachably locked with a hood lock mounted on an upper member of a radiator core support located in the engine room at a forward end thereof.

The radiator core support has an upper member and a lower member both of which extend in a vehicle width direction (see Japanese Patent Application Publication No. 2001-18837).

Further, the upper member and the lower member have central portions in the vehicle width direction which are connected to each other via a stay and a hood lock is mounted on the central portion of a front face of the upper member in the vehicle width direction to which the stay is coupled.

SUMMARY OF THE INVENTION

With the front structure of the related art vehicle body, however, if the upper member encounters an increased impact load when the hood panel is closed, there has been a risk of causing the front portion of the vehicle body to vibrate or causing the upper member to slightly deform. During the running of the vehicle, further, there has been a risk of causing the front portion of the vehicle body to be subjected to twisting deformation at an increasing rate due to a twisting load encountered by the vehicle body.

Thus, the present invention has an object to provide a front structure of a vehicle body that can alleviate a rate of vibration of an upper member encountered when a hood panel is closed while minimizing a rate of twisting deformation caused on a front portion of the vehicle body when applied thereto during the running of a vehicle.

To achieve the above object, the present invention provides a front structure of a vehicle body which comprises a radiator core support and a hood lock adapted for detachably locking a front portion of the hood panel. The radiator core support has an upper member placed below the front portion of the hood panel and extends in a vehicle width direction, a lower member placed below the upper member and extends in the vehicle width direction, and connecting members through which the upper member and the lower member are connected. The hood lock is mounted on the upper member, which is structured in two stages on upper and lower sides including an upper-stage upper member and a lower-stage upper member placed below the upper-stage upper member to allow both left and right ends of the upper-stage upper member and the lower-stage upper member to be connected to vehicle body components located in the vehicle body on both sides thereof.

With the front structure of the vehicle body according to the present invention, the upper member is structured in the two stages on upper and lower sides composed of the upper-stage upper member and the lower-stage upper member placed below the upper-stage upper member. This allows the upper member to have further increased rigidity than that of the upper member formed in only a single stage. In addition, the both of the left and right ends of the upper-stage upper member and the lower-stage upper member are connected to the vehicle body components located in the vehicle body on both sides thereof, allowing the upper member to have further improved rigidity. In such a way, with the upper member structured to have improved rigidity, the upper member has no risk to vibrate at an increasing rate or to slightly deform. In addition, even if the vehicle body encounters a twisting load during the running of the vehicle, the upper member can efficiently absorb such a twisting load.

DETAILED DESCRIPTION OF THE EMBODIMENTS

Figure 1:
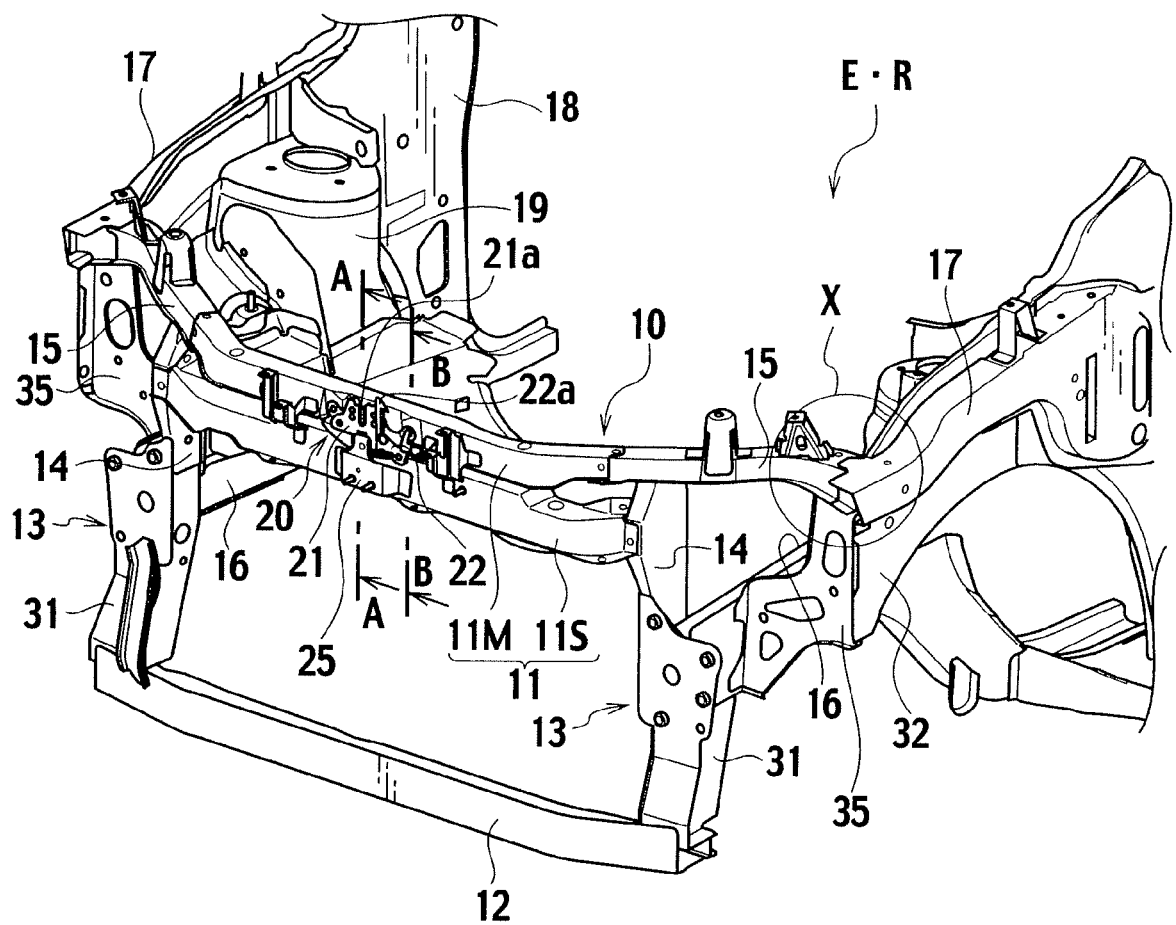
FIG. 1 is a perspective view showing a front portion of a vehicle body involving a hood lock mounting structure of an automotive vehicle of one embodiment according to the present invention.
Figure 2:
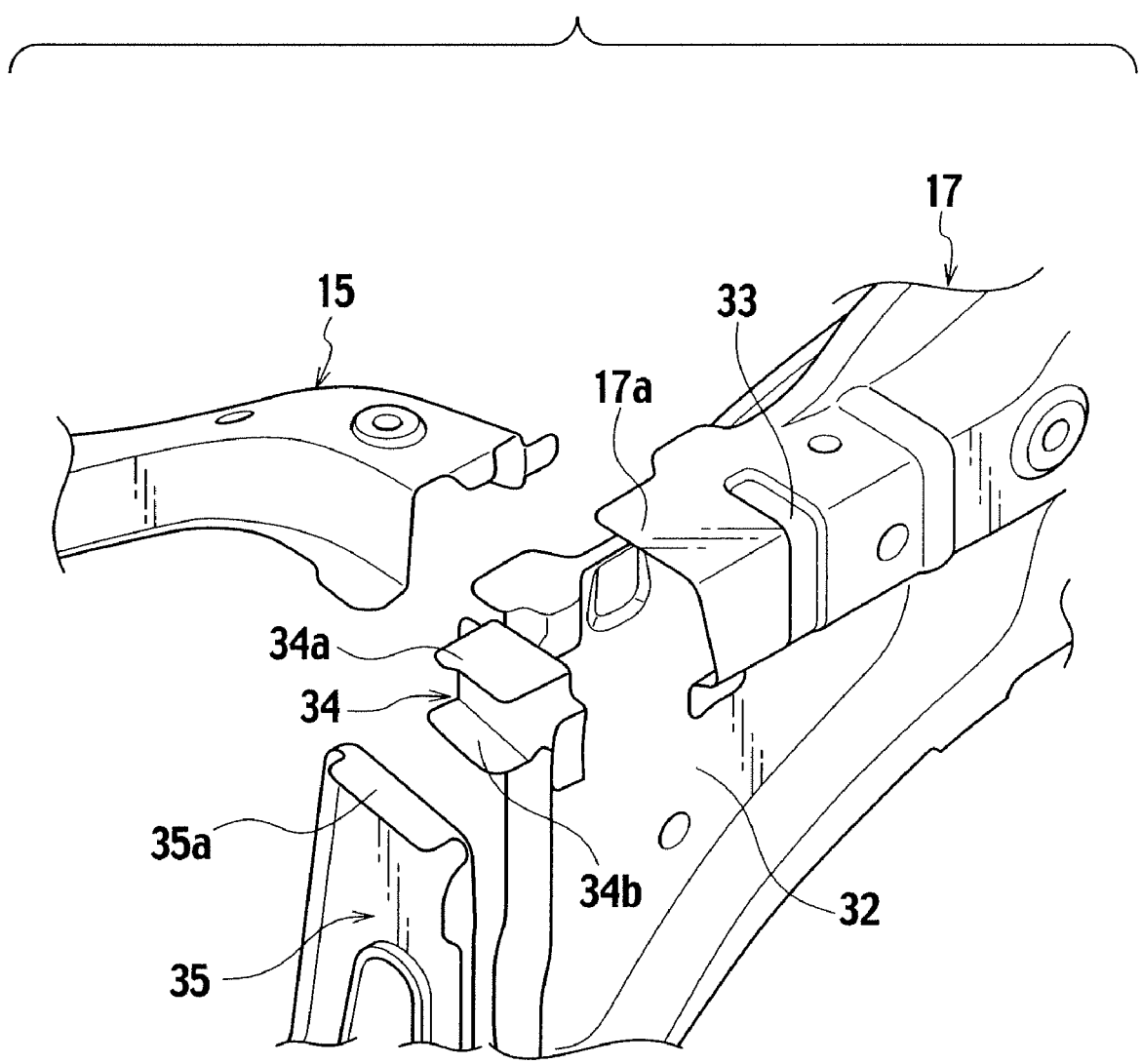
FIG. 2 is an exploded perspective view of an X portion in FIG. 1.
Figure 3:
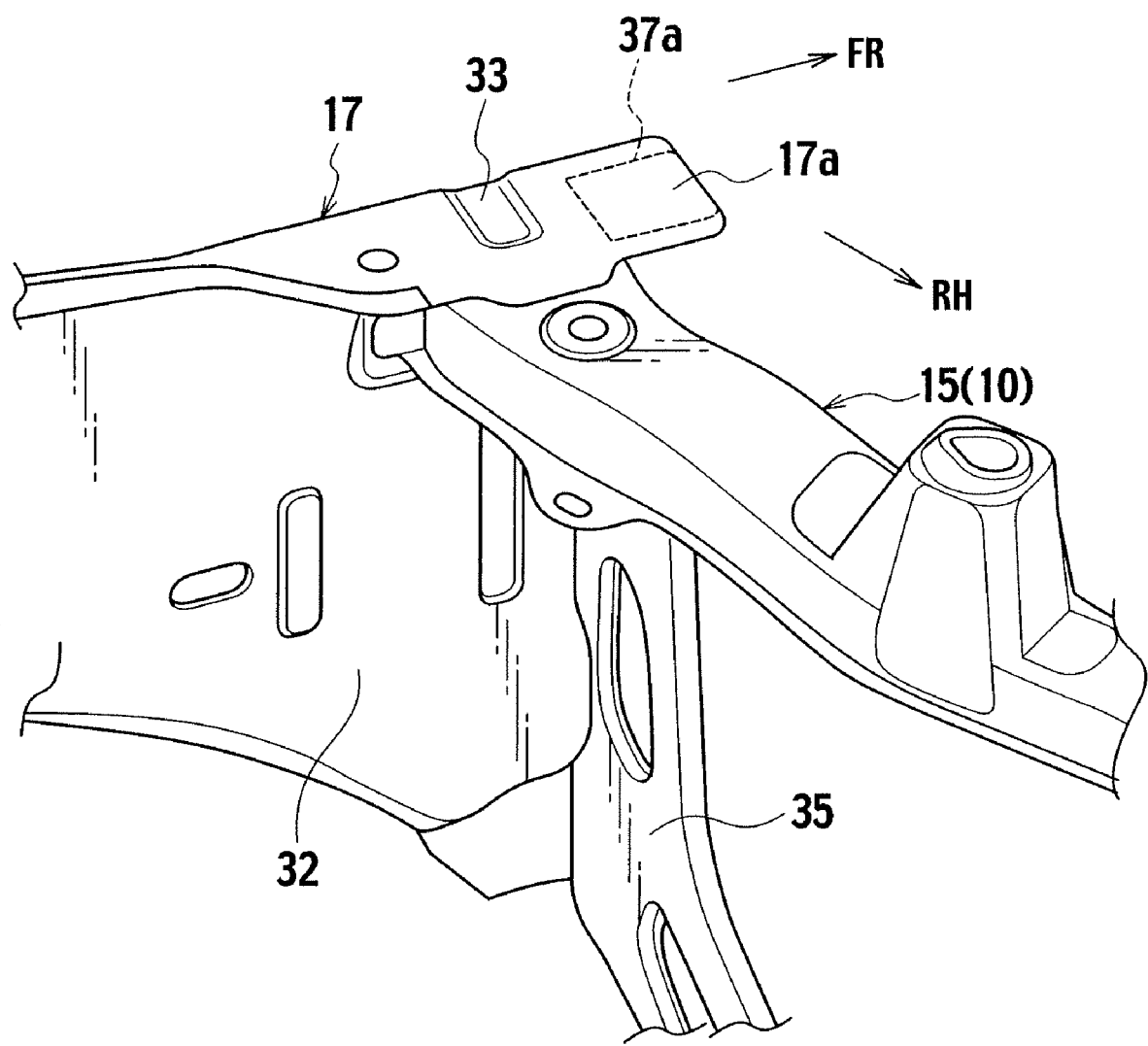
FIG. 3 is a perspective view of the X portion in FIG. 1 as viewed from an obliquely backward area.

Now, one embodiment of the present invention will be described below with reference to the accompanying drawings. FIG. 1 is a perspective view showing a front portion of a vehicle body of the present embodiment involving a hood lock mounting structure of an automotive vehicle; FIG. 2 is an exploded perspective view of an X portion shown in FIG. 1; and FIG. 3 is a perspective view of the X portion, shown in FIG. 1, as viewed from an obliquely backward area.

As shown in FIG. 1, an engine room E·R has a front area in which a radiator core support 10 is provided with a structure carrying a radiator having a radiator core (not shown). Such a structure allows an outside airflow, admitted to the engine room E·R through a front grill (not shown), to cool the radiator core. The radiator core support 10 has both ends connected to front side members 16 and hood ridge members 17, respectively.

The front side members 16 are placed in the engine room E·R on both sides thereof in the vehicle width direction so as to extend in the fore and aft direction of the vehicle body.

The hood ridge members 17 are located above the front side members 16 so as to extend in the fore and aft direction of the vehicle body and have rear base end portions coupled to front pillars 18, respectively. Further, the hood ridge members 17 have intermediate portions that are connected to the front side members 16 via strut towers 19, respectively. That is, the strut towers 19 have upper portions connected to the hood ridge members 17 and lower portions connected to the front side members 16, respectively. In addition, the hood ridge members 17 are connected to the front side members 16 via connecting brackets 35, respectively.

The radiator core support 10 has a nearly rectangular frame in shape, as viewed from a front, which has an opening portion in which the radiator core is accommodated. The radiator core support 10 includes an upper member 11 disposed below a hood panel H (see FIG. 6) at a front thereof and extending in the vehicle width direction, a lower member 12 disposed below the upper member 11 and extending in the vehicle width direction, and a pair of connecting members 13 through which the upper member 11 and the lower member 12 are connected to each other.

The upper member 11 includes an upper-stage upper member 11M placed in an upper area and involving radi-core sides 15, and a lower-stage upper member 11S disposed below the upper-stage upper member 11M and connected thereto. The upper-stage upper member 11M and the lower-stage upper member 11S are closely spaced from each other in a vertical direction. The radi-core sides 15, forming the upper-stage upper member 11M, have both lateral end portions joined to front end portions of the hood ridge members 17.

Further, the lower-stage upper member 11S has both lateral end portions coupled to end faces of reinforce radi-core sides 14 each extending in the vertical direction. The reinforce radi-core sides 14 have upper ends connected to the radi-core sides 15, respectively, and lower ends connected to bracket ad-on frames 31. Thus, the reinforce radi-core sides 14 stand so as to allow the radi-core sides 15, the lower-stage upper member 11S and the bracket ad-on frames 31 to be connected in vertical directions. Moreover, the front side members 16 have front ends connected to the bracket ad-on frames 31.

Here, the connecting members 13 includes the reinforce radi-core sides 14, the bracket ad-on frames 31 and connecting brackets 35, respectively, through which the upper-stage upper member 11M and the lower-stage upper member 11S are connected to the lower member 12.

The connecting members 13 are provided on the radiator core support 10 at only both ends thereof in the vehicle width direction. That is, the connecting members 13, provided in a pair on left and right sides, are not disposed on the radiator core support 10 at an intermediate portion thereof in the vehicle width direction.

As shown in the exploded perspective view shown in FIG. 2, further, each hood ridge member 17 has a sidewall, facing outside in the vehicle width direction, which is formed with a bead 33 extending in a vertical direction to provide increased strength. The hood ridge member 17 is formed in a nearly U-shape in cross section and has a front end formed with a nearly rectangular opening portion with a support bracket 32 and the connecting bracket 35 being connected to each other. Fitted to this opening portion is a reinforcing bracket 34, which has an upper flange 34a, connected to a leading end flange 17a of the hood ridge member 17, and a lower flange 34b connected to a joint flange 35a of the connecting bracket 35.

Figure 4:
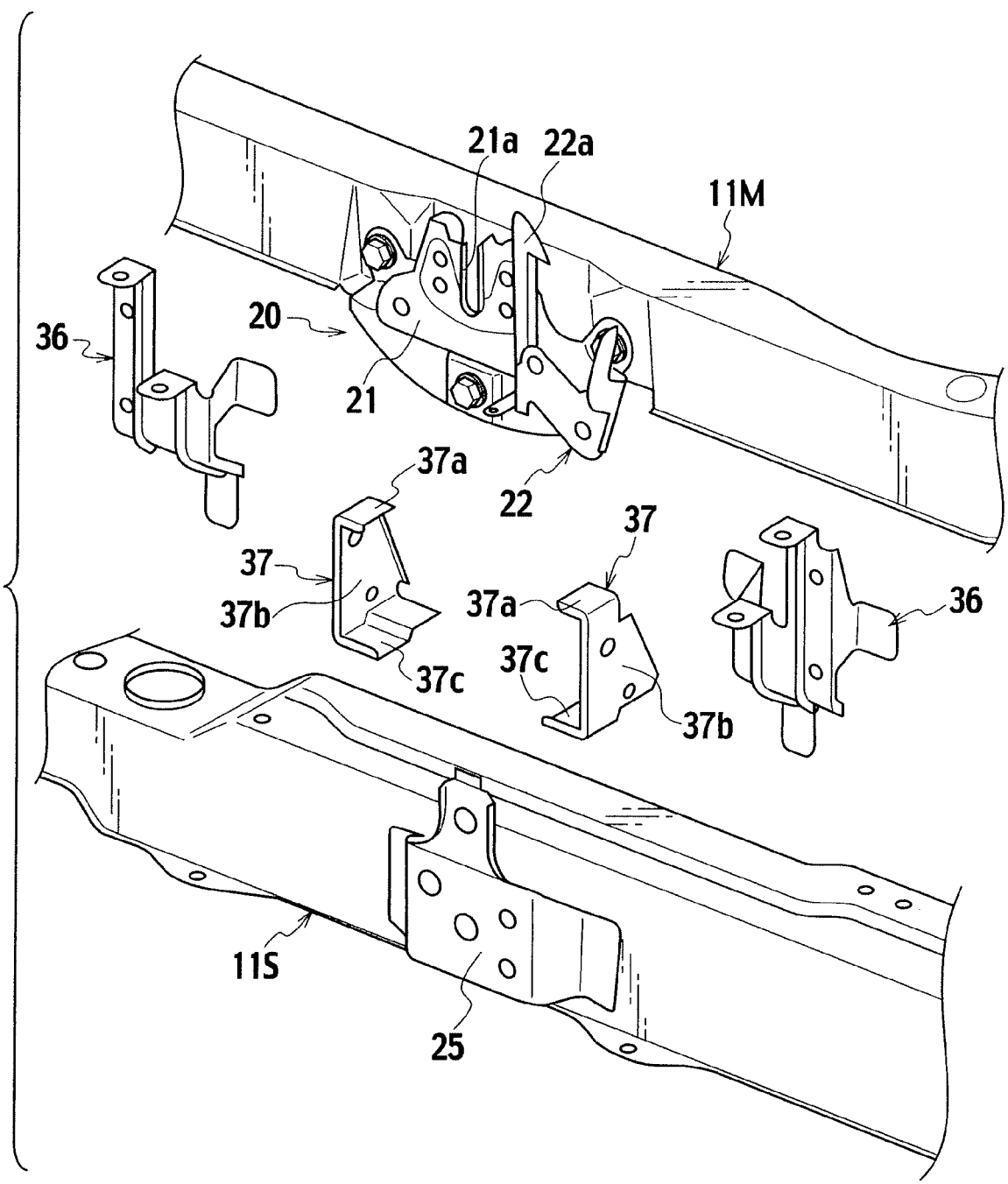
FIG. 4 is a perspective view of an upper member with an upper-stage upper member and a lower-stage upper member being disassembled.
Figure 5:
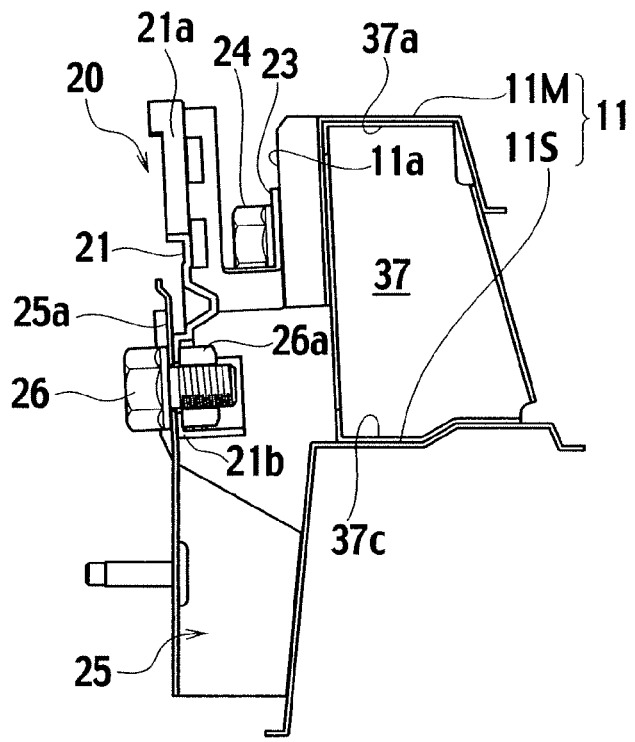
FIG. 5 is a cross sectional view taken on line A-A of FIG. 1.

FIG. 4 is a perspective view of the upper members with the upper-stage upper member and the lower-stage upper member being shown in an exploded state; FIG. 5 is a cross section taken on line A-A of FIG. 1; and FIG. 6 is a cross section taken on line B-B of FIG. 1.

Figure 6:
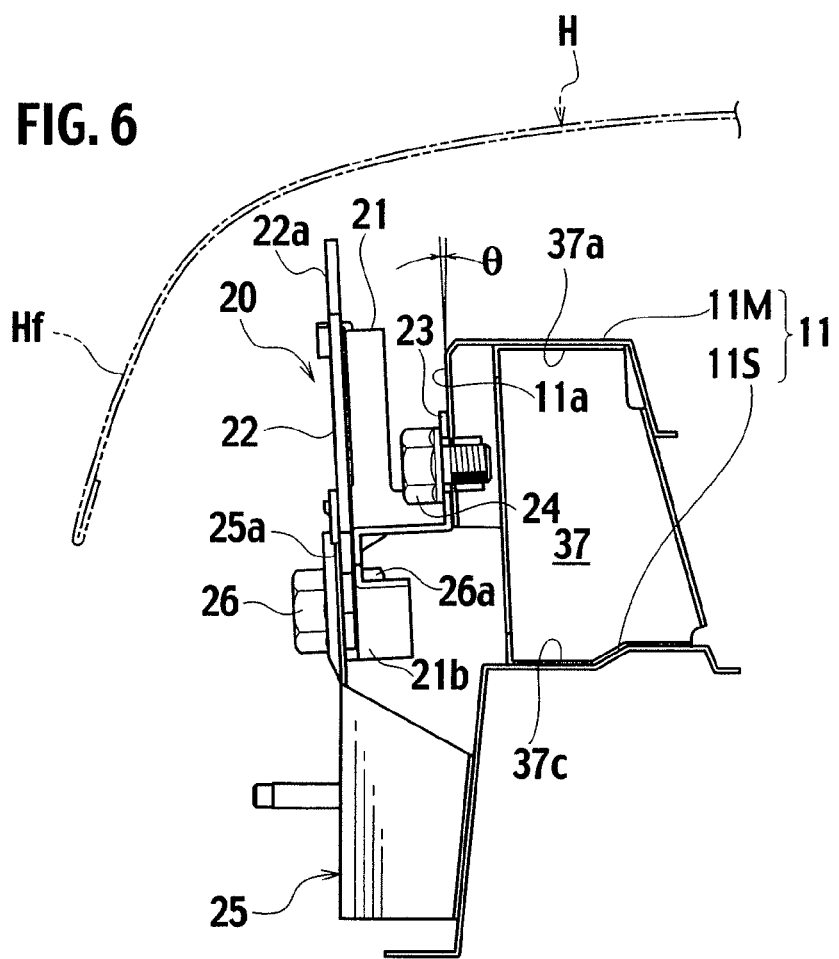
FIG. 6 is a cross sectional view taken on line B-B of FIG. 1.

First, as shown in FIGS. 4 and 6, a hood lock 20 serves to allow a front end portion Hf of a hood panel H to be detachably locked. The hood lock 20 has a base plate 21, formed with a recess portion 21a available to engage a striker (not shown) of the hood panel H and having a hook (not shown) to lock the striker, and a manual lever 22 pivotally mounted on the base plate 21. A hook 22a is integrally formed on the manual lever 22 to engage an engaging portion (not shown) of the hood panel H.

When the hood panel H is closed, the hood lock 20 allows the striker, fitted to the recess portion 21a of the base plate 21, to be locked with a hook (not shown), thereby locking the hood panel H in a fixed place. When an attempt is made to open the hood panel H, a manual operation is performed in a vehicle compartment to release the locking between the striker and the hook after which the manual operation is performed in the vehicle compartment to pivot the hook 22a such that the hook 22a is disengaged from the engaging portion of the hood panel H. This releases the locking of the hood panel H.

Further, the upper-stage upper member 11M and the lower-stage upper member 11S are connected to each other by means of a pair of left and right gussets 37 and 37. Each gusset 37 has an upper flange 37a, placed on an upper area of the gusset 37 so as to extend inward in the vehicle width direction, a lower flange 37c placed on lower area of the gusset 37 so as to extend inward in the vehicle width direction, and a vertical wall portion 37b through which the upper flange 37a and the lower flange 37c are integrally connected to each other in a vertical direction. That is, the upper flange 37a and the lower flange 37c, forming parts of the gusset 37 on a left side of the vehicle, are directed rightward of the vehicle. Further, the upper flange 37a and the lower flange 37c, forming parts of the gusset 37 on a right side of the vehicle, extend leftward of the vehicle. Thus, the upper-stage upper member 11M and the lower-stage upper member 11S are connected to each other with the gussets 37 each formed in a nearly U-shape configuration as viewed from a front as shown in FIGS. 5 and 6. More particularly, the gussets 37 are accommodated in the upper-stage upper member 11M with the upper flange 37a being joined to an upper surface of the upper-stage upper member 11M while the lower flange 37c is joined to an upper surface of the lower-stage upper member 11S. In addition, the hood lock 20 has left and right sides to which brackets 36 and 36 are fixedly mounted.

As shown in FIG. 5, further, the upper member 11 has a central area in the vehicle width direction whose front surface is formed with a hood lock mounting surface 11a on which the hood lock 20 is mounted. With the present embodiment, the hood lock mounting surface 11a is formed on the upper-stage upper member 11M. In addition, the hood lock interconnects the upper-stage upper member 11M and the lower-stage upper member 11S to each other.

With the present embodiment, the hood lock 20 is mounted on the upper member 11 in abutting contact therewith. That is, with the present embodiment, the hood lock 20 is directly mounted on the upper member 11. As shown in FIGS. 5 and 6, more particularly, the hood lock 20 has a rear surface (a surface facing rearward of the vehicle) formed with a mounting flange portion 23 to be held in abutting contact with the hood lock mounting surface 11a. Subsequently, the mounting flange portion 23 is brought into abutting contact with the hood lock mounting surface 11a of the upper member 11 to be mounted thereon with a bolt 24.

In mounting the hood lock 20 on the upper-stage upper member 11M and the lower-stage upper member 11S so as to stride over these components, as shown in FIG. 5, a base plate 21 has a lower end formed with a first connecting portion 21b. Further, the lower-stage upper member 11S has a front surface to which a mounting bracket 25 is connected for mounting an impact sensor (not shown) and the mounting bracket 25 has an upper area formed with a second connecting portion 25a.

With the first and second connecting portions 21b and 25a connected to each other by means of a bolt 26 and a nut 26a, further, the hood lock 20 can be mounted on the upper-stage upper member 11M and the lower-stage upper member 11S so as to stride over these components.

As shown by a double-dotted line in FIG. 6, the hood panel H has the front end portion Hf extending from an upper side of the hood lock 20 to a front of the vehicle in a rounding state.

Accordingly, the front end portion Hf of the hood panel H and the hood lock 20 are placed in face-to-face relation to each other in a fore and aft direction of the vehicle. In addition, the hood lock mounting surface 11a, formed on the upper-stage upper member 11M of the upper member 11, is leaned forward at a given angle θ. With the hood lock mounting surface 11a leaned forward, the hood lock 20 takes a leaning state as a whole. In addition, the expression "the hood lock mounting surface 11a is leaned forward" refers to a leaning condition under which an upper end of the hood lock mounting surface 11a is located further forward of the vehicle than a lower end thereof.

With the present embodiment described above, the upper-stage upper member 11M and the lower-stage upper member 11S are coupled to separate component parts of the vehicle body, respectively. In particular, the left and right ends of the radi-core sides 15, forming parts of the upper-stage upper member 11M, are connected to the hood ridge members 17 at front ends thereof. Meanwhile, the left and right ends of the lower-stage upper member 11S are connected to the front side members 16 via the reinforce radi-core sides 14, respectively. Accordingly, this efficiently disperses a twisting load being input to the vehicle body when the vehicle runs.

With the upper-stage upper member 11M and the lower-stage upper member 11S connected to each other via the hood lock 20, the gussets 37 and the reinforce radi-core sides 14, further, the upper member 11, comprised of the upper-stage upper member 11M and the lower-stage upper member 11S, has increased rigidity in structure.

Further, the strut towers 19 are located inside the engine room E·R and the hood ridge members 17 and the front side members 16 are connected to the strut towers 19, respectively. In addition the end portions of the upper-stage upper member 11M are connected to the front end portions the hood ridge members 17, respectively. Accordingly, this allows a load, input to the strut towers 19 during the running of the vehicle, to be transferred to the upper-stage upper member 11M via the hood ridge members 17 and transferred to the lower-stage upper member 11S via the reinforce radi-core sides 14. Thus, the loads input to the strut towers 19 are dispersed to the upper-stage upper member 11M and the lower-stage upper member 11S to be transferred thereto, resulting in a capability of minimizing twisting deformation of the vehicle body caused by the input loads.

Further, the hood lock 20 is mounted on the upper member 11 in abutting contact with the upper member 11. This enables the hood lock 20 to have a further minimized rate of protruding forward relative to the upper member 11 than that of a structure in which the hood lock is distanced forward from the upper member to enable improvement in freedom in design for the front end portion Hf of the hood panel H.

With the present embodiment, further, the connecting members 13 are provided on the radiator core support 10 at only both ends thereof in the vehicle width direction. This results in further improved ventilating efficiency with increased heat exchange efficiency when an outside air stream passes through the radiator core support 10 than that achieved in a case where the connecting members 13 are provided on the radiator core support 10 at the both ends and the middle portion thereof in the vehicle width direction. In addition, it becomes possible to have improved good-looking when looking at the radiator core support 10 through a bumper opening portion and a front grill (both of which are not shown) at a front of the vehicle.

With the present embodiment, furthermore, the upper member 11 is comprised of the upper-stage upper member 11M and the lower-stage upper member 11S disposed below the upper-stage upper member 11M and connected thereto. Thus, the upper member 11 takes a dual stage structure to enable the upper member 11 to have increased rigidity, thereby enabling the upper member 11 to have support the hood panel H with increased rigidity.

With the present embodiment, moreover, the hood lock 20 is mounted in a position striding over the upper-stage upper member 11M and the lower-stage upper member 11S, permitting the hood lock 20 to function as a member for the upper-stage upper member 11M and the lower-stage upper member 11S to be connected. This results in increased rigidity for the upper-stage upper member 11M and the lower-stage upper member 11S to be connected, thereby enabling a further increase in rigidity of the upper member 11.

With the present embodiment, further, the upper member 11 has the hood lock mounting surface 11a with which the hood lock 20 is held in abutting contact. In addition, the front end portion Hf of the hood panel H extends from an upper area to another area in front of the vehicle in a rounding state to allow the front end portion Hf of the hood panel H and the hood lock 20 to be placed in opposition to each other with the hood lock mounting surface 11a being leaned forward. Accordingly, with the hood lock mounting surface 11a being leaned forward, the hood lock 20 can be leaned forward. This enables an increase between the front end portion Hf of the hood panel H, extending from the upper area to another area in front of the vehicle in the rounding state to allow the front end portion Hf of the hood panel H and the hood lock 20 to be placed in opposition to each other at the front of the vehicle, and the lower end of the hood lock 20. This enables the front end portion Hf of the hood panel H to have further improved freedom in design.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

CROSS REFERENCE TO RELATED APPLICATIONS

The entire contents of Japanese Patent Application No. 2007-316971 with a filing date of Dec. 7, 2007 and Japanese Patent Application No. 2008-204366 with a filing date of Aug. 7, 2008 in Japan are hereby incorporated by reference.

What is claimed is:
1. A front structure of a vehicle body comprising:
   a radiator core support comprising an upper member disposed below a front portion of a hood panel in a closed state and extending in a vehicle width direction, a lower member disposed below the upper member and extending in the vehicle width direction, and connecting members through which the upper member and the lower member are connected;
   a hood lock mounted on the upper member for detachably locking the front portion of the hood panel;
   a left and right reinforce radi-core side;
   a left and right hood ridge member, each comprising a front end portion;
   a left and right side member, each comprising a front end portion; and
   a left and right strut tower connected to the hood ridge members and the side members, wherein the upper member comprises an upper-stage upper member and a lower-stage upper member located below the upper-stage upper member, wherein left and right ends of the upper-stage upper member and the lower-stage upper member are connected to vehicle body components on both sides thereof, wherein the upper-stage upper member and the lower-stage upper member are connected to discrete body components, wherein the upper-stage upper member comprises a left and right end portion connected to the front end portions of the hood ridge members, and wherein the lower-stage upper member comprises a left and right end portion connected to the front end portions of the side members via the reinforce radi-core sides.

2. The front structure of the vehicle body according to claim 1, wherein:

the upper-stage upper member is connected to the lower-stage upper member.

3. The front structure of the vehicle body according to claim 2, further comprising:

a left and right gusset;

wherein the upper-stage upper member is connected to the lower-stage upper member via at least one of the group consisting of the hood lock, the gussets and the reinforce radi-core sides.

4. The front structure of the vehicle body according to claim 1, wherein:

the hood lock is mounted on the upper member in abutting contact with the upper member.

5. The front structure of the vehicle body according to claim 1, wherein:

the connecting members are located on the radiator core support on both ends thereof.

6. A front structure of a vehicle body comprising:

a radiator core support comprising an upper member disposed below a front portion of a hood panel in a closed state and extending in a vehicle width direction, a lower member disposed below the upper member and extending in the vehicle width direction, and connecting members through which the upper member and the lower member are connected; and a hood lock mounted on the upper member for detachably locking the front portion of the hood panel, wherein the upper member comprises an upper-stage upper member and a lower-stage upper member located below the upper-stage upper member, wherein left and right ends of the upper-stage upper member and the lower-stage upper member are connected to vehicle body components on both sides thereof, wherein the upper member comprises a hood lock mounting surface with which the hood lock is kept in abutting contact, wherein the hood panel comprises a front end portion that extends from an area above the hood lock to an area in front of a vehicle, and wherein the hood lock and the front end portion of the hood panel are located in opposition to each other in a fore and aft direction of the vehicle with the hood lock mounting surface being leaned forward.

* * * * *